US005870811A

United States Patent [19]

Ciok

[11] Patent Number: 5,870,811

[45] Date of Patent: Feb. 16, 1999

[54] CHAIN LINK LOCKING CLIP REMOVAL TOOL

[76] Inventor: Ray Ciok, 12A Acorn Trail, Oakridge, N.J. 07438-9728

[21] Appl. No.: 892,555

[22] Filed: Jul. 14, 1997

[51] Int. Cl.$^{6}$ .......... B23P 19/04

[52] U.S. Cl. .......... 29/229; 29/243.56; 254/28

[58] Field of Search .......... 254/28, 131, 120, 254/21, 25, 18; 29/229, 267, 270, 278, 243.56

[56] References Cited

U.S. PATENT DOCUMENTS

| | | | |
|---|---|---|---|
| 2,711,109 | 6/1955 | Gillstrom | 254/28 |
| 3,825,226 | 7/1974 | Appleman | 254/28 |
| 4,049,236 | 9/1977 | Grill et al. | 254/28 |
| 4,219,187 | 8/1980 | Brumfield | 254/28 |
| 4,930,749 | 6/1990 | Lawrence | 254/28 |
| 5,031,881 | 7/1991 | Thurmston | 254/28 |

*Primary Examiner*—Robert C. Watson
*Attorney, Agent, or Firm*—Bernard J. Murphy

[57] ABSTRACT

An elongate, steel rod has a terminal end which defines a wedge, and a handle on the opposite end. Adjacent to the terminal end, there is a barrier provided to prevent excessive travel of the wedge under the limb of a locking clip.

5 Claims, 1 Drawing Sheet

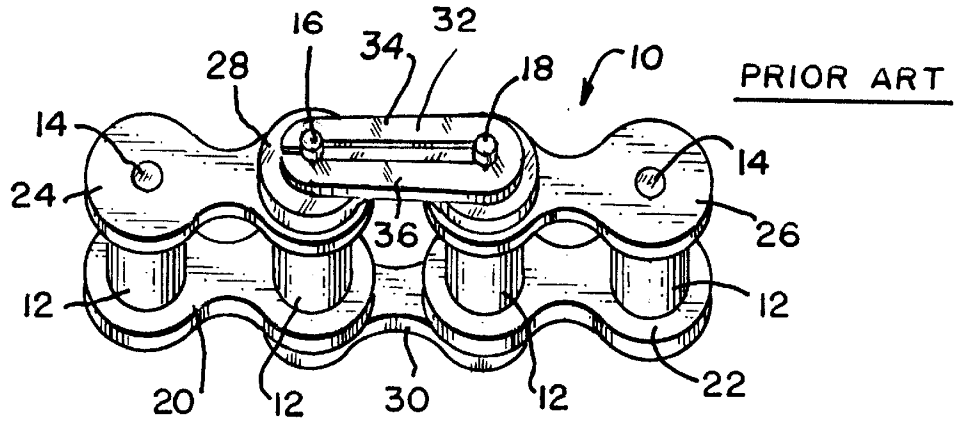
FIG. 1
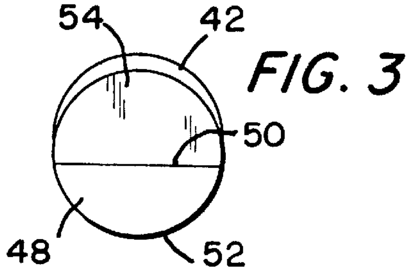
FIG. 3
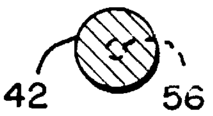
FIG. 4
FIG. 2
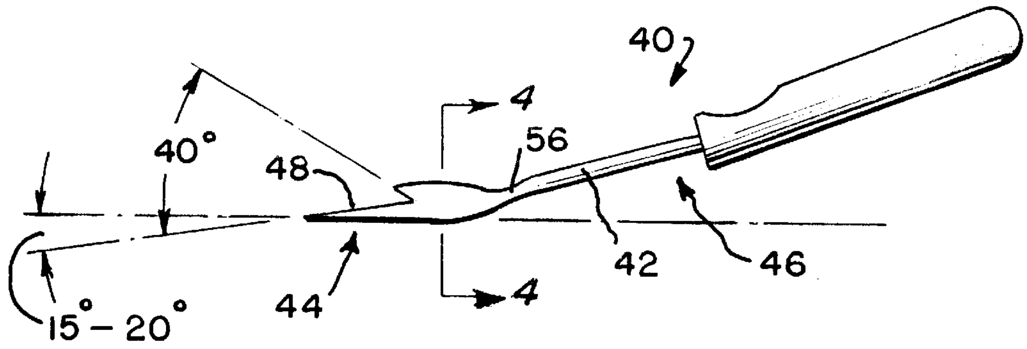

CHAIN LINK LOCKING CLIP REMOVAL TOOL

This invention pertains to tools designed for, or otherwise useful for removing the locking clip of the master link of link-type chains, and in particular to a tool of simple manufacture, and safe and efficient utility, for facilely disengaging and removing the aforesaid locking clip.

In the prior art, other tools designed for the stated purpose are exemplified by U.S. Pat. No. 2,577,193, issued on Dec. 4th, 1951, to P. J. Imse, for a Tool for Facilitating the Removal of Spring Clips from Sprocket Chains and the Like; U.S. Pat. No. 3,854,282, for a Key for Master Chain Link, issued to Carlman Mazel, on Dec. 17, 1974; and U.S. Pat. No. 3,937,005, issued to Raymond Becker, on Feb. 10th, 1976, for a Key for Removing Locking Members from Drive Chains or the Like.

In addition, it is a well-known practice, albeit ill-advised, to use a simple screwdriver to attempt the removal of the locking clip of the master link of link-type chains.

Without a proper tool the opening of a master link locking clip can be difficult and awkward, Especially, if the link-type chain, and its master link is heavily greased, the screwdriver, or such, will slip inadvertently, and the party working the tool can suffer injury.

The tools disclosed in the aforecited prior patents have some facility for the removal of master link locking clips, but they are size-limited, in that they have use on locking clips with only given width between the limbs of the clip. If the width is great, then a wider tool is necessary; and if the width is very small, a narrower tool is necessary. As a consequence it would be required to stock a selection or variously dimensioned tools for the progressively sized locking clips of link-type chains.

As for the screwdriver, if it doesn't cause an injury to the user, it can deform the locking clip beyond use; in addition, it lacks a barrier, to prevent a penetration of the blade end of the screwdriver too far into the locking clip.

What has been long needed is a tool for the removal of the locking clip of a master link of a link-type chain which has none of the size limitations of the aforesaid prior art, patented tools. The need, in addition, has been for such a tool which has a barrier to prevent injury to the tool user, and to insure against damaging the locking clip.

It is an object of this invention, then, to disclose just such a long sought tool. Particularly, it is an object of this invention to set forth a chain link locking clip removal tool comprising an elongate rod; wherein a terminal end of said rod comprises a wedge; and a portion of said rod, adjacent to said terminal end, comprises a barrier.

Further objects of this invention, as well as the novel features thereof, will become apparent, by reference to the following description, taken in conjunction with the accompanying figures, in which:

FIG. 1 is a perspective illustration of a master link of a link-type chain, with the locking clip thereof prominently shown;

FIG. 2 is a side elevational view of the novel chain link locking clip removal tool, according to an embodiment thereof;

FIG. 3 is a greatly enlarged, front elevational view of the working end of the tool; and FIG. 4 is a cross-sectional view, taken along section 4—4 of FIG. 2, in substantially twice the scale of FIG. 2.

As shown in FIG. 1, a portion of a link-type chain 10 comprises cylinders or rollers 12 secured by pins 14, 16 and 18 to links 20, 22, 24, 26, 28 and 30. The locking clip 32 is clasped, via the limbs 34 and 36 thereof, onto the pins 16 and 18. Confronting ends of the limbs 34 and 36 meet at the slit 38 of the clip 32. The same, as illustrated and described, is quite conventional and exemplary of prior art link-type chains.

The novel tool 40, is shown in FIGS. 2, 3 and 4. The tool 40 comprises a rod 42 having a working end 44 and an opposite, handle end 46. The working end 44 terminates in a wedge 48 which, in this embodiment, defines an acute angle of from fifteen to twenty degrees of arc, however, the invention comprehends a wedge 48 in which the angle thereof can be from approximately ten to approximately twenty-five degrees of arc.

As can be seen in FIG. 3, the wedge 48 comprises a pair of faces 50 and 52, which meet in the aforesaid angle, wherein face 50 is flat, and face 52 is arcuate. Face 50 terminates in a barrier 54, the same provided to insure that the wedge 48 will not penetrate too far under a limb 34 or 36. Between flat face 50 and barrier 54 there obtains an angle of forty degrees of arc, in this embodiment of the invention. Optionally, the face 50- to -barrier 54 angle can be from approximately thirty to approximately fifty degrees of arc.

Between the working end 44 of the tool 40, and the handle end 46 thereof, there is a portion 56 in which the rod 42 is circumferentially recessed. This provisioning insures that, while the tool 40 is addressed to one of the limbs 34 and 36, it will clear the alternative limb on the opposite side of the clip 32.

In use, the wedge 48 is pressed in under one of the limbs 34 or 36, immediately adjacent the pin 16, and forced thereunder until the barrier 54 reaches the limb being addressed. With pressure, and a slight twist of the tool 40, the limb being wedged under will remove from the pin 16. The fact that the face 52 is arcuate, it serves a camming action which facilitates the lifting of the wedged limb up and away from the pin 16. With the one limb released from the pin 16, the clip 32 is easily removable.

To install the clip 32, with the use of the tool 40, the tool 40 is rotated one hundred and eighty degrees to apply the barrier 54 to one of the limbs 34 or 36. For example, limb 36 is to be set against the pin 16; in this circumstance, limb 34 will be atop the pin 16. Now, one places the wedge face 50 onto the limb 34, and slides it forward until the barrier engages the limb 34. With sufficient pressure of the tool 40 against the limb 34, with the barrier 54 pushing it slightly away from limb 36, the limb 34 will snap into place on the pin 16. The tool 40 is very durable; it is formed of steel, and the leading end of the wedge 48 is hardened.

While I have described my invention in connection with a specific embodiment thereof, it is to be clearly understood that this is done only by way of example and not as a limitation to the scope of the invention as set forth in the objects thereof, and in the appended claims.

I claim:

1. A chain link locking clip removal tool, comprising:

an elongate rod; wherein a terminal end of said rod comprises a wedge;

a portion of said rod, adjacent to said terminal end, comprises a barriers;

said wedge comprises a pair of faces which meet in an acute angle;

one of said faces is flat; and the other of said faces, transverse thereof, is arcuate.

2. A chain link locking clip removal tool, according to claim 1, wherein:

said wedge defines an acute angle of from approximately ten to approximately twenty-five degrees of arc.

3. A chain link locking clip removal tool, according to claim 1, wherein:

said one face terminates at said barrier.

4. A chain link locking clip removal tool, according to claim 3, wherein:

said barrier and said one face define an angle, therebetween, of from approximately thirty to approximately fifty degrees of arc.

5. A chain link locking clip removal tool, according to claim 1, wherein:

one end of said rod comprises a first, working end of said tool;

an opposite end of said rod comprises a second, handle end of said tool; and a portion of said rod, intermediate said first and second ends, is circumferentially recessed.

* * * * *